United States Patent
Gschwind et al.

(10) Patent No.: US 7,387,114 B2
(45) Date of Patent: Jun. 17, 2008

(54) HEATING DEVICE FOR A FLUID LINE AND METHOD OF MANUFACTURE

(75) Inventors: Thomas Gschwind, Bad Dürkheim (DE); Klaus Beetz, Karlsruhe (DE)

(73) Assignee: DBK David + Baader GmbH (DE)

( * ) Notice: Subject to any disclaimer, the term of this patent is extended or adjusted under 35 U.S.C. 154(b) by 0 days.

(21) Appl. No.: 10/519,694

(22) PCT Filed: Jun. 27, 2003

(86) PCT No.: PCT/EP03/06814

§ 371 (c)(1),
(2), (4) Date: Oct. 13, 2005

(87) PCT Pub. No.: WO2004/003420

PCT Pub. Date: Jan. 8, 2004

(65) Prior Publication Data

US 2006/0144376 A1    Jul. 6, 2006

(30) Foreign Application Priority Data

Jun. 27, 2002   (EP) .................................. 02014325

(51) Int. Cl.
*F02M 25/06* (2006.01)
(52) U.S. Cl. ...................... 123/573; 219/488
(58) Field of Classification Search .............. 392/465, 392/478, 479, 480, 485, 487, 497, 502; 219/205; 123/572–574
See application file for complete search history.

(56) References Cited

U.S. PATENT DOCUMENTS

| | | | |
|---|---|---|---|
| 2,355,693 A * | 8/1944 | Aldrich | 123/557 |
| 3,176,115 A * | 3/1965 | Balis | 204/196.16 |
| 4,255,646 A * | 3/1981 | Dragoy et al. | 392/396 |
| 4,312,121 A | 1/1982 | Tweed | |
| 4,371,777 A * | 2/1983 | Roller et al. | 392/480 |
| 4,512,324 A * | 4/1985 | Neary | 123/557 |
| 4,922,882 A | 5/1990 | Töpfer | 123/572 |
| 5,970,962 A | 10/1999 | Nelson et al. | 123/573 |
| 6,062,206 A | 5/2000 | Nelson et al. | 123/573 |
| 6,442,341 B1 * | 8/2002 | Wu | 392/479 |
| 6,493,508 B1 * | 12/2002 | Roesgen | 392/485 |
| 6,804,459 B2 * | 10/2004 | Raghavan et al. | 392/484 |
| 2003/0039474 A1 * | 2/2003 | Eller et al. | 392/489 |

FOREIGN PATENT DOCUMENTS

| | | |
|---|---|---|
| DE | 24 32 782 A1 | 1/1976 |
| EP | 1 164 264 A1 | 12/2001 |
| JP | 10-121937 | 5/1998 |
| JP | 10-231543 | 9/1998 |
| JP | 2001-220776 | 8/2001 |

* cited by examiner

*Primary Examiner*—M. McMahon
(74) *Attorney, Agent, or Firm*—Seed IP Law Group PLLC

(57) ABSTRACT

Embodiments of the present invention relate to a heating device for a fluid line, in particular for a crankcase venting system in an internal combustion engine, with a heating element and with a holding device, through which the heating element can be mounted on the fluid line. Embodiments of the invention also relate to a fluid line for the accommodation of the said heating device and to a heating module with a fluid line and a heating device fitted to it. Embodiments of the invention also relate to a method for the manufacture of the heating device mentioned above.

42 Claims, 6 Drawing Sheets

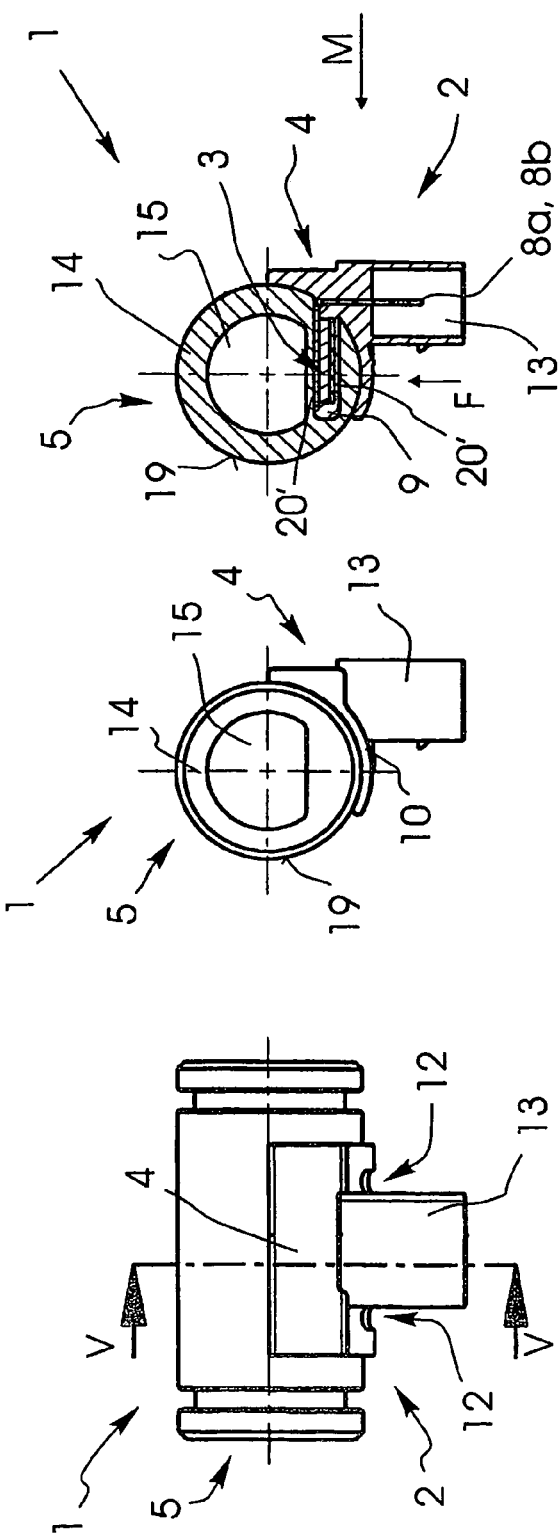
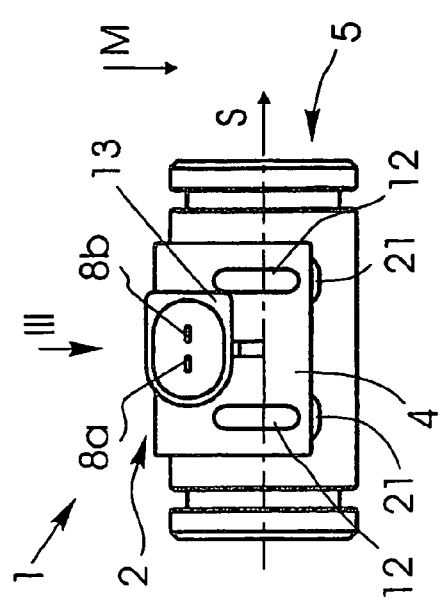
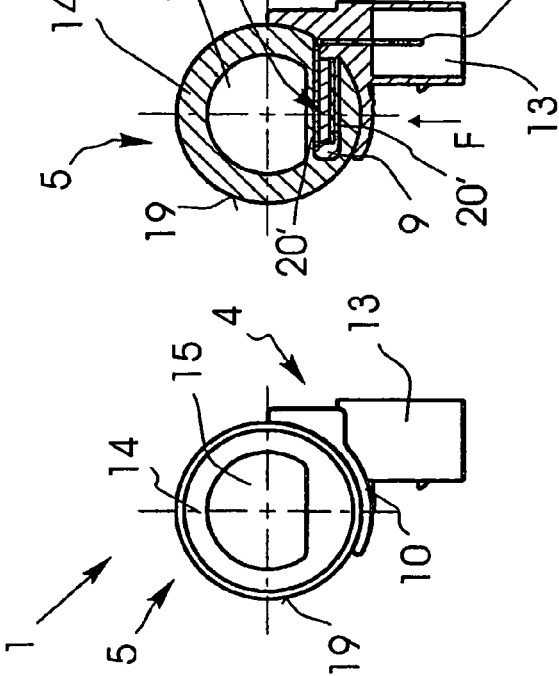
FIG. 2
FIG. 3
FIG. 4
FIG. 5

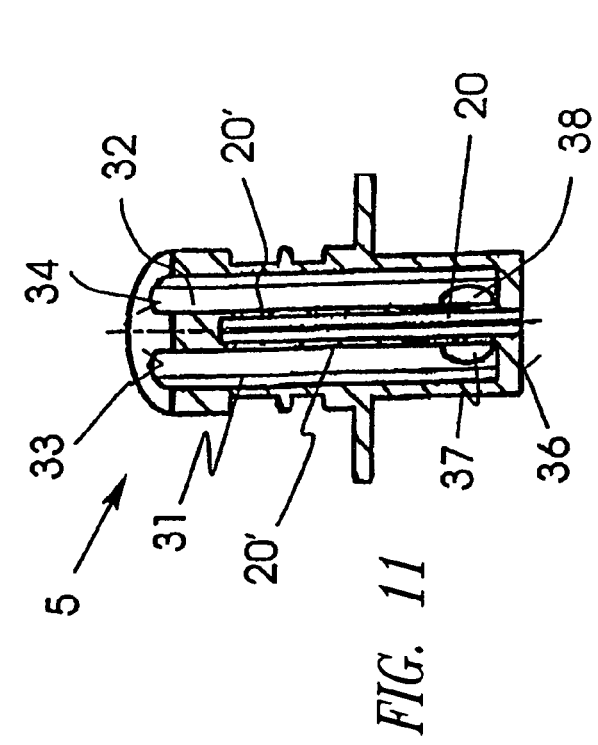
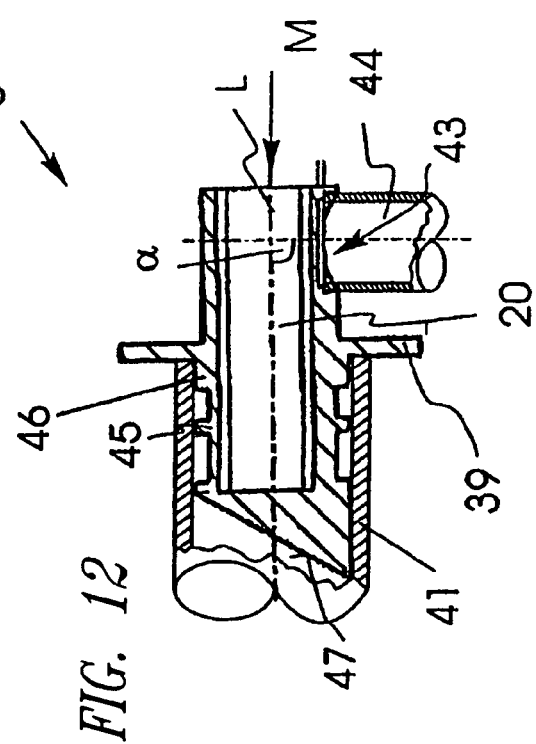
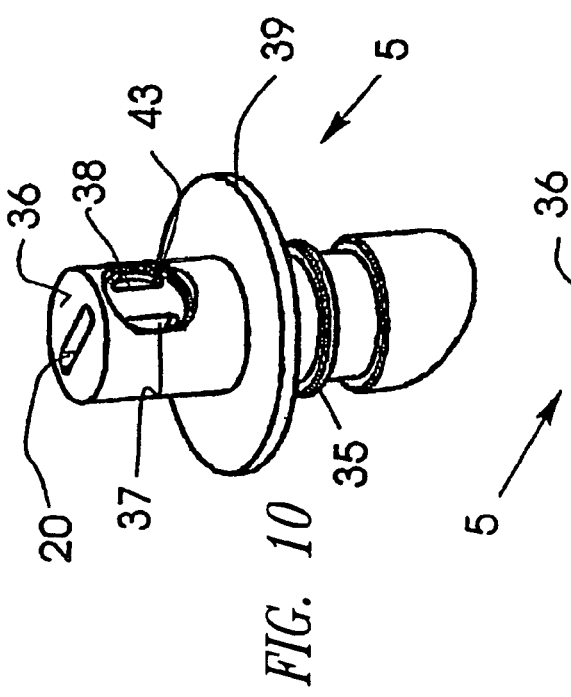
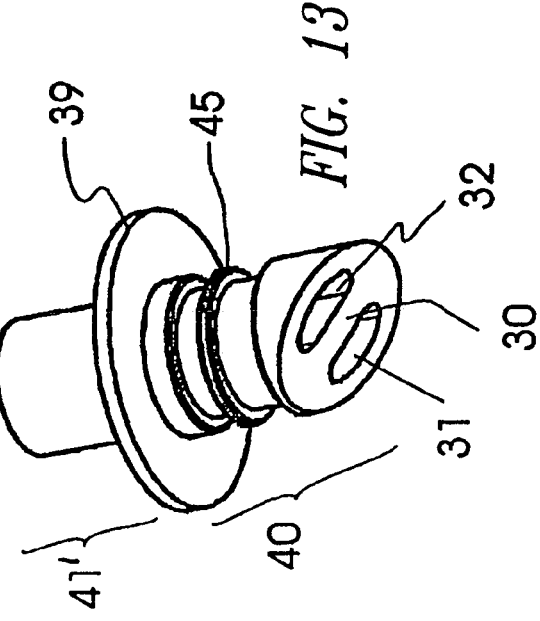

HEATING DEVICE FOR A FLUID LINE AND METHOD OF MANUFACTURE

BACKGROUND OF THE INVENTION

1. Field of Invention

The present invention generally relates to a heating device for a fluid line, in particular for a crankcase venting system in an internal combustion engine, with a heating element and with a holding device, through which the heating element can be mounted on the fluid line. The invention also relates to a fluid line for the accommodation of the said heating device and to a heating module with a fluid line and a heating device fitted to it. Finally, the invention also relates to a method for the manufacture of the heating device mentioned above.

2. Description of the Related Art

In modern internal combustion engines, vents are provided for the crankcase which houses the crank mechanism with the crankshaft, the connecting rods and the pistons as well as the cylinders. The crankcase is sealed on the cylinder side by one or more cylinder heads and underneath a sump pan is normally joined to the crankcase.

When the internal combustion engine is operated, the crankcase fills up to the cylinder head with oil vapours and gases which leak out of the combustion chamber in the cylinders past the piston rings. These oil vapours and gases are also known as blow-by gases. Due to the pumping motion of the pistons, the blow-by gases are subjected to pressure. Since the oil vapours and gases in the crankcase contain large quantities of ecologically harmful hydrocarbons, measures have to be taken to prevent the escape of the oil vapours and gases from the crankcase.

For this purpose it is known that crankcase vents can be provided which connect the internal space of the crankcase to the air intake lines of the internal combustion engine, so that the blow-by gases are sucked out of the crankcase, together with the fresh air and are burnt.

If the fresh air and the blow-by gases from the crankcase exhibit however substantially different temperatures, condensation and precipitation can take place in the mixing section, which blocks the crankcase vents.

In particular with car engines, high temperature differences arise in winter between the cold intake air on one hand and the blow-by gases from the crankcase which heat up quickly with the engine block. In some cases this can even lead to the icing up or blockage of the opening of the fluid line of the crankcase vent. With a blockage of the crankcase vent a high pressure builds up in the crankcase which can press the lubricating oil out of the seals on the crankshaft, sump pan or out of the opening for the oil dipstick. In addition, the pistons are subjected to increased work against the high pressure in the crankcase, leading to a reduction in the efficiency of the internal combustion engine.

The condensation of the gases and the precipitation of mixture constituents at low outside temperatures is avoided in the state of the art by heating devices in the lines to the crankcase vent. These types of heating devices are for example known from DE-A-2432782, U.S. Pat. No. 4,922, 882, U.S. Pat. No. 5,970,962, U.S. Pat. No. 6,062,206, JP-AA-10231543, JP-M-10121937 and EP-A-1164264.

With the crankcase vent of DE-A-2432782 the opening of the venting line on the intake system can be heated electrically. For this, a heating device is used which consists of a metal tubular piece with an electrical heating conductor arranged coaxially on its jacket surface. For heating, a winding of resistance wire located on a coil bobbin is used.

A disadvantage with the heating device of DE-A-2432782 is primarily the large space requirement which renders its use with modern engines almost impossible. In addition, the heating device in DE-A-2432782 is difficult to install and difficult to replace should damage occur.

U.S. Pat. No. 4,922,882 deals with a crankcase venting system which is heated via the cooling system of the internal combustion engine. For this, a ring pipe is provided surrounding the intake line and being located in the region of the feed line of the crankcase gases into the engine intake line. With very cold outside temperatures, the ring pipe is heated by the cooling system.

With the further developed heating devices of U.S. Pat. No. 5,970,962 and U.S. Pat. No. 6,062,206 a PTC (Positive Temperature Coefficient) heating element is used instead of the resistance wire. The heating element is connected for thermal conduction with a heatsink which surrounds the opening of the crankcase vent. The heatsink and the heating element are integrated into a plug which simultaneously forms the opening of the crankcase vent. Although the space requirement with the devices of U.S. Pat. No. 5,970,962 and U.S. Pat. No. 6,062,206 is less than with the heating device of DE-A-2432782, their complicated manufacture and their poor accessibility on the internal combustion engine are disadvantages during servicing.

In JP-AA-10231543, a heating device is shown with which a cylindrical, metal thermal radiator element is inserted into a through opening of a pipe. At the other end of the thermal radiator element a mounting seat is attached water-tight to a mounting seat on the pipe end. The cylindrical thermal radiator element protrudes into a flow and transfers heat from the heating device directly into the fluid in the pipe.

JP-AA-10121937 relates to a heater for blow-by gases using a PCV valve. The housing of the PCV valve is heated by a heater hose via a leaf-spring clip.

In EP-A-1164264 the PTC elements are stuck onto the fluid line for the crankcase venting by an electrically non-conducting silicone adhesive and sprayed with plastic after mounting. In this way a compact construction is achieved irrespective of the design of the fluid line. However, the heating device of EP-A-1164264 can be improved with respect to its service friendliness.

Considering the disadvantages of the state of the art of known heating devices, it is desirable to improve a heating device for fluid lines, in particular for crankcase vents of internal combustion engines, such that with a compact construction they are more convenient for servicing and are easier to install.

BRIEF SUMMARY OF THE INVENTION

According to the present invention, a holding device exhibits a protrusion in which a heating element can be held and which is designed so that it can be inserted into a radially parallel running well of an outer wall of a fluid line.

This solution is constructively simple and facilitates the space-saving fitting of the heating device on the fluid line in that the heating element is simply inserted into the well of the outer wall. This solution also simplifies installation and maintenance, because the heating element only has to be inserted into the pocket or taken out of it complete with the holding device.

A secure mounting of the heating device on the fluid line, but one that can be repeatedly released for service purposes, is achieved in an exemplary embodiment of the present invention in which the holding device exhibits an elastic clamping section, which, at least partially, is designed for fitting or contracting on the outer wall of the fluid line. Furthermore, between the projection and the clamping section, a recess can be formed, in which, at least partially, the outer wall of the fluid line can be accommodated. This recess enables the heating device to be fitted to the fluid line in a space-saving manner.

In another embodiment, the well itself can be provided with a projection or a recess which provides latching with the holding device.

Any fluid-transporting element, such as a piece of pipe or a valve through which fluid flows, can be used as a fluid line.

The cross-section of the well in the direction perpendicular to the insertion direction of the projection can be designed in the form of a polygon, such as a rectangle. For a thermal transition through a large area, a flat side of the polygon can point in the direction of the inner space of the fluid line. The projection can exhibit a cross-section corresponding to the well. In addition, the well, the projection, or both can exhibit coding elements, which only allow the insertion of the projection into the well in the installation orientation.

In yet another embodiment, the projection can also be formed directly by at least one contact plate, whereby, on the projection, the heating element is held by the contact plate and is at the same time supplied with electrical power. In this respect, the contact plate is extended appropriately and extends from the holding device into the well.

In still another embodiment, the heating element can be premounted in the holding device so that the holding device is formed as a module unit. Such a premounted module unit can be substantially more easily handled during installation than separate components which are assembled only in the well. Also, the replacement of the heating device during inspections is simplified.

A compact design with a long service life can be achieved through the use of a PTC element. The PTC heating element can be arranged between two electrically conducting contact plates which are connected to the poles of a power source. The contact plates can continue in a single piece in connecting contacts to a plug connector, so that the complicated routing of intervening electrical leads can be omitted. An external power source, for example a car battery, can be connected via such a plug connector to supply the heating element.

The plug connector can be integrally formed by the holding device. Additionally or alternatively, the holding device can be manufactured as an injection molded part. Costly additional insulation of the electrical leads from the plug connector to the heating element can be omitted, if the holding device is produced of an electrically insulating material, for example plastic. In this way the leads can be routed directly in the holding device from the heating element to the plug connector without an insulating protective layer.

In yet another embodiment, in order to simplify the installation of the heating device on the fluid line and to avoid damage during the installation process, the holding device can exhibit at least one guiding element, through which the holding device is guided into the well in the insertion direction during insertion.

According to still another embodiment of the invention, the fluid line is adapted to the use of the heating device through constructive measures in line with one of the above arrangements. For this, the fluid line can be provided with a tubular line section, which is surrounded by an outer wall. To accommodate the projection of the holding device and the heating element of the heating device, a well is provided, which has at least one well wall adjacent to the inner space of the fluid line and in which a heating element and a holding device can be accommodated. The well can extend in the outer wall radially parallel or in the longitudinal direction of the fluid line. Complicated sealing of the well with respect to the inner space of the fluid line can be omitted if the well is separated from the inner space of the fluid line by the outer wall.

The well can be formed between an inner surface facing the inner space of the fluid line and an outer surface of the outer wall facing outwards. Due to the reduced wall thickness, improved thermal conduction is achieved from the well to the inner space of the fluid line.

The well walls can form a projection, which protrudes into the inner space of the fluid line and has fluid flowing around it in operation. In this way a thermal transfer into the fluid takes place on both sides of the heating element inserted into the well.

Additionally or alternatively, the projection can be extended to form a partition so that the inner space of the fluid line is subdivided into two separate flow regions which run to both sides of the well. Also with this arrangement, flow around the well walls is achieved.

To avoid weakening the outer wall of the fluid line by the well and at the same time to keep the size small, the inner surface of the outer wall facing the inner space of the fluid line can exhibit a flat section. In the region of the flat section, the thickness of the outer wall of a fluid line with otherwise circular flow cross-section is increased without the outer diameter of the fluid line being enlarged.

In yet another embodiment, the outer wall can exhibit at least one guide element by which the heating device is guided in an insertion direction during installation or during removal. The guide element prevents the heating device from slipping or shifting on the fluid line. At least one guide element can be provided on the heating device to interact with the at least one guide element on the fluid line on the device. A groove extending in the direction of the well is possible, for example, as the guide element.

In order to achieve a good heat transfer between the heating element and the outer wall of the fluid line, it is advantageous if a contact, as good and with a contact area as large as possible, is present between the heating element and the outer wall of the fluid line. This contact can, for example, be achieved by a spring element which presses the heating element against the outer wall. The spring element can be accommodated by the holding device and be supported on it in the installed state. If designed as a module unit the spring element can also be premounted.

Alternatively or additionally, to pressing the heating element using the spring element, the heating element can also be pressed against the outer wall by a plastic deformation of the fluid line and the well. Weakened regions in the outer wall in which the mechanical strength is reduced compared to the surrounding vicinity can achieve a controlled and locally limited plastic deformation. Such a weakened region leads to a concentration of the deformation in its vicinity.

The effect of the plastic deformation can in particular be limited on the well if the weakened region is arranged in the region of the well, in particular overlapping radially with the well.

Additionally or alternatively, the guide elements are used in a double function simultaneously as weakened regions.

In one embodiment, in order to distribute the thermal energy radiated from the heating element over the complete flow cross-section of the fluid line, the fluid line can be made from a thermally conducting metallic material, for example from aluminum or copper pipes or from pipes consisting of aluminum alloys or copper alloys.

In another embodiment, a thermally conducting body can be provided which is designed for insertion into the fluid line and is in contact with the well. The heat conducting body can be made from a thermally conducting metallic material and can surround the inner space of the fluid line, whereby the contact surface of the thermally conducting body with the fluid is as large as possible. In particular, the thermally conducting body can exhibit passages through which the fluid is guided and the contact area is increased.

Additionally or alternatively, the thermally conducting body is designed for mounting in the fluid line. Its outer contours can be matched to the inner contours of the fluid line.

According to one embodiment of the invention, the heating device and the adapted fluid line can be provided as a kit for retrofitting internal combustion engines.

According to yet another embodiment, in the assembled state the heating device and the fluid line form a heating module which can be built into a crankcase venting system.

In the following the invention is explained by way of examples and based on embodiments with reference to the drawings. The same reference symbols are used for the same or similar components. The elements which are different for the individual embodiments can be combined together as required.

BRIEF DESCRIPTION OF THE SEVERAL VIEWS OF THE DRAWINGS

FIG. 2 illustrates the embodiment of FIG. 1 in the assembled state in a plan view;

FIG. 3 illustrates the embodiment of FIG. 1 in the assembled state in a side view;

FIG. 4 illustrates the embodiment of FIG. 1 in the assembled state in a frontal view;

FIG. 5 illustrates a view along the plane V-V of FIG. 3;

FIG. 10 illustrates a fluid line of still another embodiment of the invention in a perspective view;

FIG. 11 illustrates the fluid line of FIG. 10 in a further perspective view;

FIG. 12 illustrates the fluid line of FIG. 10 in a longitudinal section transverse to a partition;

FIG. 13 illustrates the fluid line of FIG. 10 in a longitudinal section in a plane perpendicular to the plane of the longitudinal section of FIG. 12;

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with heating devices or fluid lines have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
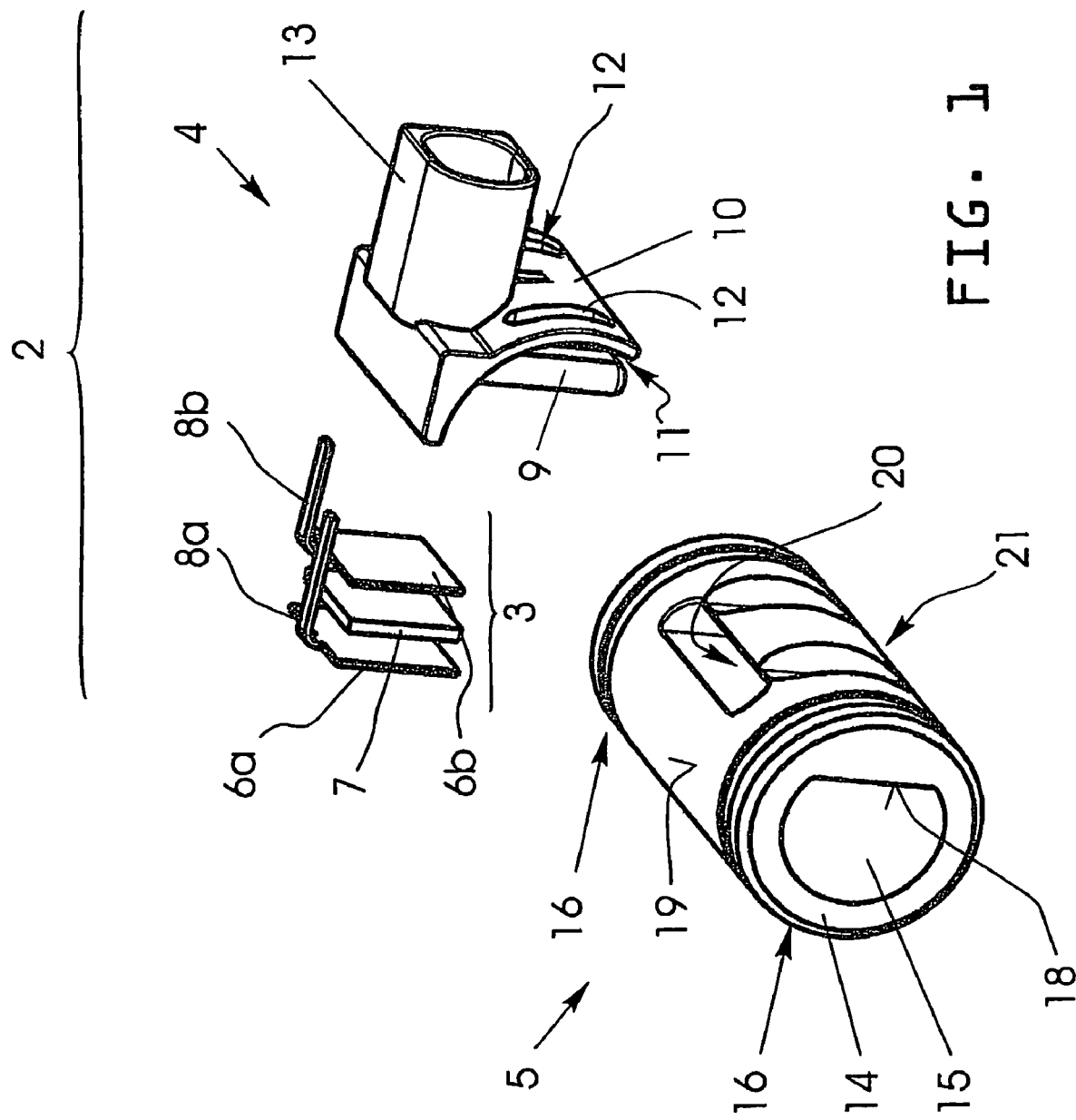
FIG. 1 illustrates an embodiment of the invention comprising a holding device, a heating element and a fluid line in an exploded view.
Figure 6:
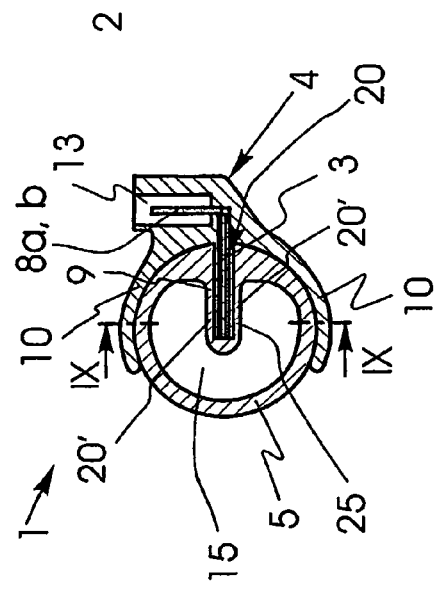
FIG. 6 illustrates yet another embodiment of the invention in a frontal view.

Firstly, the construction of a first embodiment of a heating module according to one embodiment of the invention is explained for a crankcase venting system of an internal combustion engine based on the exploded representation of FIG. 1.

FIG. 1 illustrates a heating module that has a heating device 2, which comprises a heating element 3 and a holding device 4. The heating module 1 also consists of a fluid line 5 to which the heating device 2 can be attached.

In the embodiment according to FIG. 1 the heating element 3 is formed as a PTC heating element 7 arranged between two contact plates 6a, 6b. Each integrally formed as one piece, the contact plates 6a, 6b couple to contact lugs 8a and 8b, which are each bent by 90° with respect to the plane of the respective contact plate 6a, 6b.

The holding device 4 exhibits a nose-shaped projection 9, in which (not seen in FIG. 1) the heating element 3 can be held or accommodated. Furthermore, the holding device 4 has a clamping section 10, which is separated from the projection 9 by a recess 11. In the embodiment of FIG. 1, the clamping section 10 is formed as a tongue which is elastically sprung in the direction of the projection 9. It can, however, also be formed as a latching device at another point, for example on the projection 9.

In the embodiment of FIG. 1, the clamping section 10 extends over the projection 9 in the shape of a circular segment. In the region of the clamping section 10, at least one guide element 12 is provided. In the embodiment of FIG. 1, two guide elements 12 are provided. The guide element 12 is here formed as a dent extending longitudinally in the direction of the projection 9 and pointing in the direction of the projection 9.

Moreover, the holding device 4 exhibits a plug connector section 13, which can be connected to a plug connector (not illustrated in FIG. 1) for the electrical supply of the heating element 3.

As can be seen in FIG. 1, the holding device 4 is made as a molded part on which the projection 9, the clamping section 10 and the recess 11 are integrally formed. The holding device 4 can in particular be injection molded. The holding device 4 can be made from an electrically insulating material, for example a plastic.

The fluid line 5 is of a tubular shape and has an outer wall 14 surrounding an inner space or interior 15 in which the gases, for example from a crankcase, flow. A mounting section 16, via which the fluid line piece 5 can be connected to an internal combustion engine, is arranged on each of the two ends of the fluid line piece 5 in the longitudinal direction.

An inner surface of the outer wall 14 facing the inner space 15 forms a flat surface 18 in one region so that a region of greater wall thickness arises between the surface 18 and the outer surface 19 of the outer wall 14.

A well 20, which is dimensioned such that it accommodates the projection 9 of the holding device 4 with the inserted heating element 3, extends in the outer wall 14 between the flat surface 18 and the round, cylindrical outer surface 19. In the embodiment of FIGS. 1 to 6 the well walls 20' are formed by the outer wall 14.

In the direction transverse to the mounting direction M, the well 20 exhibits a polygonal cross-section, whereby a flat side of the polygon is turned towards the inner space 15. The plate-shaped heating element 3 abuts this flat side. The projection 9 exhibits a cross-section corresponding to the cross-section of the well 20, for example a rectangular cross-section as in the embodiments of FIGS. 1 to 6.

As can be seen in FIG. 1, the well 20 opens in a radially parallel direction, i.e. offset from the central plane of the fluid line 3 transverse to the longitudinal extension of the fluid line. In the embodiment of FIG. 1, the well 20 is in addition arranged between the flat surface 18 and the outer surface 19 in the region of increased wall thickness and extends parallel to the flat surface 18.

In the radial direction overlapping with the well 20, at least one weakened region 21 is provided in the outer surface 19 of the outer wall 14. As can be seen in FIG. 1, the embodiment illustrated here exhibits two weakened regions 21.

The two weakened regions 21 are arranged such that they interact with the guide elements 12 of the holding device 4 and guide the holding device 4 on insertion of the projection 9 into the well 20. Thus, the weakened regions 21 of the embodiment of FIG. 1 are formed as grooves extending radially parallel and parallel to the flat surface 18.

In one embodiment, the fluid line 5 is produced from a thermally conducting material, such as for example aluminum, copper, an aluminum alloy or a copper alloy.

In the following the arrangement of the heating device 2 and the fluid line 5 in the assembled heating module 1 is explained based on FIGS. 2 to 5.

In order to assemble the heating module, first the heating element 3 is inserted into a recess on the projection 9 so that the heating element 3 and the holding device 4 form a module unit, which is pushed into the well 20 (shown in FIG. 1) of the fluid line 5 in a mounting direction M. As can be seen from FIG. 2, with the heating element 3 and the holding device 4 assembled, the contact sections 8a, 8b continue into the plug connector section 13, where they can be contacted by a plug (not illustrated).

The mounting direction M, in which the heating device 2 is inserted into the fluid line 5, runs in the direction of the well 20 (shown in FIG. 1), i.e. substantially transverse to the flow direction S of the fluid in the fluid line 5. Since the mounting direction M, and therefore also a possible demounting direction, runs transverse to the flow direction S and therefore transverse to the longitudinal extension of the fluid line 5, mounting and demounting of the holding device 4 is possible even with a permanently installed fluid line, for example on an engine block or on other line sections.

In the assembled heating module 1, the clamping section 10 abuts the outer surface 19 of the fluid line piece 5 with its surface facing the projection 9, as can be seen in FIG. 4. The clamping section 10 here extends around the circumference of the fluid line 5 such that—when the projection 9 is pushed into the well—it is plastically pressed away and it springs back in the fully pushed-in end position, latching the holding device 4 on the fluid element 5. As shown in FIG. 2 the guide elements 12 and 21 of the heating device 2 and the fluid line 5, respectively, here engage one another and guide the heating device 2 in the mounting direction M such that the heating device 2 cannot slip or tilt during installation.

In FIG. 3, it can be seen that the guide elements 12 of the heating device 2 extend to both ends of the plug connector section 13. Consequently, the heating module 1 can in this region be gripped, for example by pliers, and deformed by being compressed. As shown in FIG. 2, the guide elements 21 of the fluid line 5, which simultaneously act as weakened regions, concentrate the plastic deformation on the region of the well so that, as shown in FIG. 5, the projection 9 with the heating element 3, which it accommodates is pressed into the well. The pressure induces a touching contact that has a large contact area of the heating element 3 with the fluid line 5 and hence a good thermal transfer.

This can be better seen based on the sectional view of FIG. 5. Due to the exertion of a force F on the guide elements 12 (shown in FIG. 2), the heating element 3, accommodated in a recess in the projection 9, is pressed onto the outer wall 14 of the fluid line 5 in the well.

Furthermore, it can be seen in FIGS. 4 and 5 that the section of the outer wall 14 between the well and the outer surface 19 of the fluid line 5 in the recess 11 (shown in FIG. 1) is accommodated between the projection 9 and the clamping section 10. Since the clamping section 10 grips behind the outer wall 14 in the mounting direction M, the heating device 2 is secured against unintentional removal out of the fluid line 5 by positive engagement.

In the sectional illustration of FIG. 5, it can also be seen that the contact sections 8a, 8b extend through the holding device 4 to the plug connector section 13.

Since the well terminates in the outer wall 14 and is separated from the inner space 15 of the fluid line 5 by the outer wall 14, measures for sealing the plug connector section 13 with respect to the inner space 15 are omitted.

Due to the integral single-piece formation, the holding device 4 forms a housing both for the heating element 3 and for the plug connector section 13.

Although, in the embodiment explained above, the plug connector section 13 extends perpendicular to the mounting direction M, in another embodiment, a plug connector section 13 can also be provided which extends in the mounting direction M. However, in this case the tensile force for removing the plug connector acts in the mounting direction M, which can lead to the loosening or even release of the heating device 2.

In yet another embodiment, a spring element (not illustrated) can be provided, through which the heating element 3 in the well 20 is pressed against the outer wall 14 in the direction of the inner space 15, instead of or in addition to the plastic deformation of the outer wall 14 in the region of the well 20. Such a spring can, for example, be positioned between the heating element 3 and the projection 9. In order to save additional components, the spring element can be formed by the contact plate 6b arranged between the PTC heating element 7 and the projection 9.

In still another embodiment, the contact sheet 6a abutting the fluid line 5 can be omitted if the fluid line 5 acts as a contact for the PTC heating element.

The fluid line 5 can exhibit any flow cross-section and any outer cross-sectional shape.

In FIGS. 6 to 9, another embodiment of a heating device 2 according to the invention is shown, which, in the assembled state, forms a heating module 1 with the fluid line 5 and can also be fitted to the fluid line 5 as a preassembled module unit. In the following, for the sake of clarity, only the differences to the embodiment of FIGS. 1 to 5 are discussed.

Figure 7:
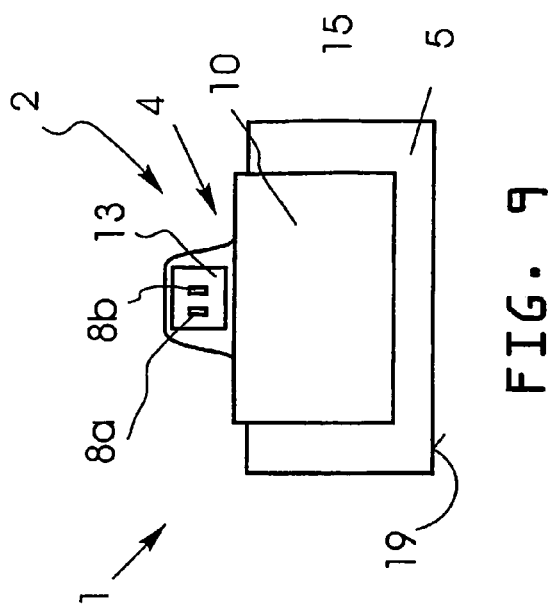
FIG. 7 illustrates a view of the embodiment of FIG. 6 in a plan view.
Figure 8:
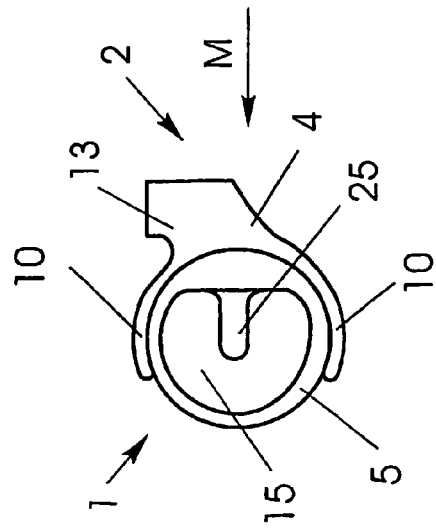
FIG. 8 illustrates the embodiment of FIG. 6 in a section along the plane VIII-VIII of FIG. 7.
Figure 9:
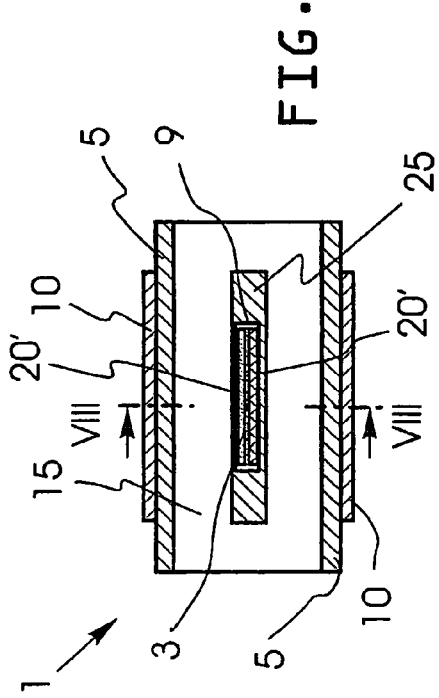
FIG. 9 illustrates the embodiment of FIG. 6 in a view along the plane of the section IX-IX of FIG. 6.

In contrast to the embodiment of FIGS. 1 to 5 and as shown in FIG. 7, the well 20 does not extend between the inner space 15 and the outer wall 19 (shown in FIG. 9) of the fluid line 5, but is rather arranged within a projection 25 which protrudes radially parallel or radially into the interior or inner space 15 so that the well walls 20' have fluid flowing over them in operation. The projection 9 of the holding device 4 is inserted into the projection 20. The projection can also be formed as a partition, as will be explained below based on another embodiment.

The mounting of the heating device 2 on the fluid line 5 can take place in a way similar to the embodiment of FIGS. 1 to 5 using the clamping sections 10 of the holding device 4, which, as can be seen in FIGS. 6 to 9 grip around the fluid line 5 on both sides.

Otherwise, the construction of the heating module of FIGS. 6 to 9 corresponds to the construction of the embodiment of FIGS. 1 to 5.

In FIGS. 10 to 13, another embodiment of a fluid line 5 is illustrated which can also be assembled to form a heating module with a heating device which, for reasons of clarity, is not shown.

In contrast to the previous embodiments, the fluid line 5 in the embodiment of FIGS. 10 to 13 is formed as an angled piece in which the fluid flow is diverted by an angle α, such as 90°. Other angles are also possible.

Furthermore, as shown in FIG. 13, the interior of the fluid line piece 5 is subdivided into two flow regions 31, 32 by a partition 30. Both flow regions 31, 32 extend in a substantially longitudinal direction L of the fluid line 5, in each case from openings 33, 34 on the inlet side to a bottom 36. As shown in FIG. 10, in the region of the bottom 36, outlet openings 37, 38 open out substantially transverse to the longitudinal direction of the fluid line 5.

As can be seen, particularly from FIG. 12, a well 20, extending in the longitudinal direction L of the fluid line 5 in the partition 30 (shown in FIG. 13), leads into the bottom 36 of the fluid line 5. The well 20 is formed to accommodate a heating device (not illustrated) so that a PTC element is positioned within it. As shown in FIG. 11, the well walls 20' form the partition 30 and, in operation, fluid flows past them.

As shown in FIG. 12, the well 20 opens in the longitudinal direction L of the fluid line so that the mounting direction M, in which a heating device is pushed into the fluid line 5, runs substantially parallel to the longitudinal direction L.

The fluid line 5 is also provided with a collar 39, which, as shown in FIG. 13, subdivides the fluid line 5 into a first region 40, which can be inserted in a sealing manner into a tube 41 as shown in FIG. 12, or into a hose, and a second region 41'. As shown in FIG. 12, in the region of the outlet openings 37, 38 the second region 41' is provided with a receptacle section 43 to which a further tube 44 or a further hose can be connected in a sealing manner to the outlet openings 37, 38.

In FIG. 12, the fluid line 5 is shown schematically in the installed state with two fluid lines 41, 44. As can be seen in this figure, the collar section 39 acts as an abutment surface for the line 41. At the same time, in the region 40, a sealing projection 45 is provided which protrudes radially outwards and co-operates sealingly with the inner surface of the line 41. In order to increase the sealing between the fluid line piece 5 and the line 41, a further sealing shoulder 46 is provided in front of the collar 39, the said shoulder extending from the collar 39 in the longitudinal direction L spaced from the sealing projection 45 in the direction of the inlet openings 33, 34 (shown in FIG. 11).

Furthermore, it can be seen in FIG. 12 that the second line 44 is connected to the receptacle section 43 of the fluid line 5.

The inlet surface 47 running diagonally with respect to the longitudinal direction L simplifies the insertion of the fluid line 5 into the line 41.

In the two embodiments of FIGS. 6 to 13, the well 20 for the accommodation of the heating element protrudes into the flow cross-section so that the heating element has gases flowing around it in operation. In this way, the thermal transport to the fluid can be improved.

Due to the well-shaped formation, the internal region of the well 20 is not connected for fluid flow to the flow cross-section of the fluid line 5 so that complicated sealing of the heating device 2 with respect to the flow cross-section of the fluid line 5 can be omitted.

Figure 14:
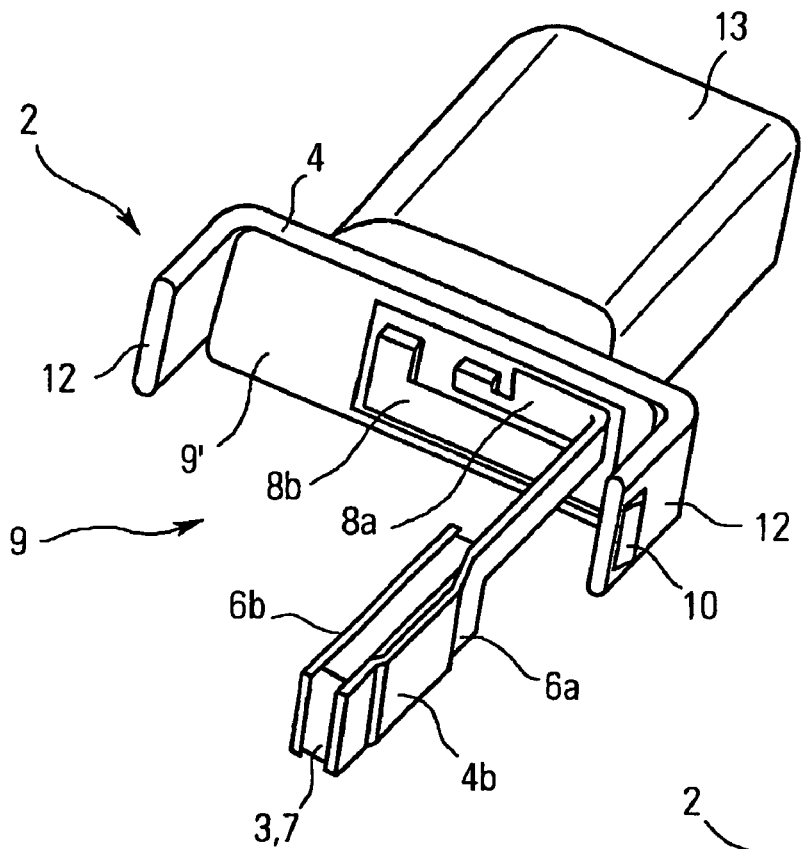
FIG. 14 illustrates still another embodiment of the invention in a perspective view.

FIG. 14 illustrates still another embodiment of a heating device 2 in a schematic perspective view. In the following, only the differences of this embodiment to the embodiments explained above are discussed.

One difference of the embodiment of FIG. 14 to the previous embodiments lies in the formation of the projection 9, which, in the embodiment of FIG. 14, is formed by at least one contact plate 6a, 6b, whereby the heating element 3 in the form of a PTC element 7 is accommodated between the two contact plates 6a, 6b. The projection 9, which is designed constructively simply, is designed so that it can be directly inserted into a well 20 (shown in FIG. 15) of a fluid line 5 or of another fluid line element.

As shown in FIG. 14, the stability of the projection 9 is achieved by the formation of at least one contact plate 6a, 6b, which extends from the holding device 4 away from the heating element 3, 7 through to the plug connector section 13 and holds the heating element 3, 7 at its end.

A section 4b of at least one contact plate 6a, 6b is formed as a spring element which is elastically deformed as the projection 9 is pushed into the well 20, thus pressing the contact plates 6a, 6b against the walls of the well 20 (shown in FIG. 15) in order to ensure a good thermal transfer from the PTC heating element 7 to the fluid to be heated.

The projection 9 can either be formed by both contact platelets 6a, 6b, which are guided to the holding device 4 electrically isolated from one another, or by just one contact platelet 6a. In the latter case, an electrical connection between the plug connector section 13 and the contact platelet, which is not part of the projection 9, can be formed via the well wall.

Furthermore, in the embodiment of FIG. 14, the holding device 4 is arranged in the form of a bow-shaped element, on the both ends of which projections 12 are provided as guide elements with latching springs 10. The region between the two guiding projections 12 is formed flat.

With the embodiment of FIG. 14 the projection 9 is preassembled with the heating element 3 and a plate-shaped installation body 9' to form a heating device, and is designed for insertion into the holding device 4. In this way, a sub-module unit is created, which can be mounted without great effort, so that for a specific form of holding device 4 various forms of projection 9 can be provided and mounted on it.

The installation body 9' is produced from non-conducting material. The contact plates 6a, 6b together with the contact elements 8a, 8b are fitted captively to the installation body 9' and continue through openings in the installation body 9' to the plug connector section 13.

Figure 15:
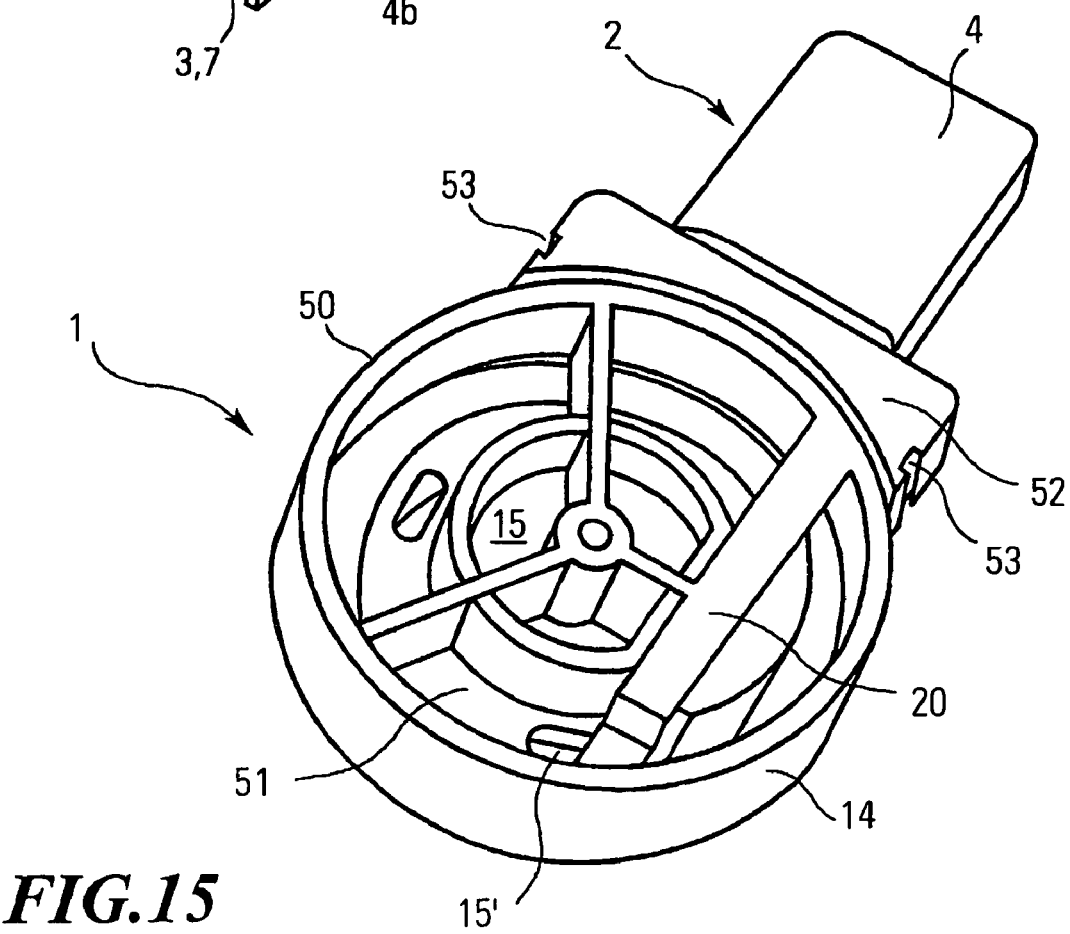
FIG. 15 illustrates the embodiment of FIG. 14 with a fluid line in the form of a diaphragm valve.

In FIG. 15, the heating device 2 of FIG. 14 is illustrated in the installed state in a schematically perspective view. Here, a valve 50 is shown in the form of a diaphragm valve as an example of a fluid line.

The valve 50 is designed in the form of an essentially tubular fluid line element which exhibits in its central region an inner space 15, which has fluid flowing through it, and the diaphragm has been omitted for clarity. In the embodiment of FIG. 15, a heat conducting element 51, which is produced from a material having a large heat transfer capability and is in a close, thermally transferring contact with the outer walls of the well 20, is built into the interior 15 of the fluid line. In this way, the heat generated by the heating element 3 (shown in FIG. 14) is transferred directly via the contact plates 6a, 6b and the well walls to the thermally conducting element 51 and is distributed by the thermally conducting element 51 as evenly as possible in the inner space 15 which has the flow passing through it. In order to make the thermal transfer surface as large as possible, openings 15', which pass flow and which are directly heated via the thermally conducting element 51, are provided in the thermally conducting element 51.

The holding device 4 is accommodated in a receptacle 52 so that the holding device 4 is essentially formed as a plug element. The latching grooves here latch in corresponding recesses 53 of the receptacle 52 and secure the heating device 2 against unintentional removal. Through the introduction of the projection 9 into the well 20, the projections 12 are automatically centered. Projections 9 and 12 are shown in FIG. 14. In the installed state the projections 12 take on side forces which act on the heating device 2. In this way the projection 9 and the heating element 3 are secured against damage in operation.

Of course, the design of the holding device 4 can also be used according to one of the previous embodiments.

Figure 16:
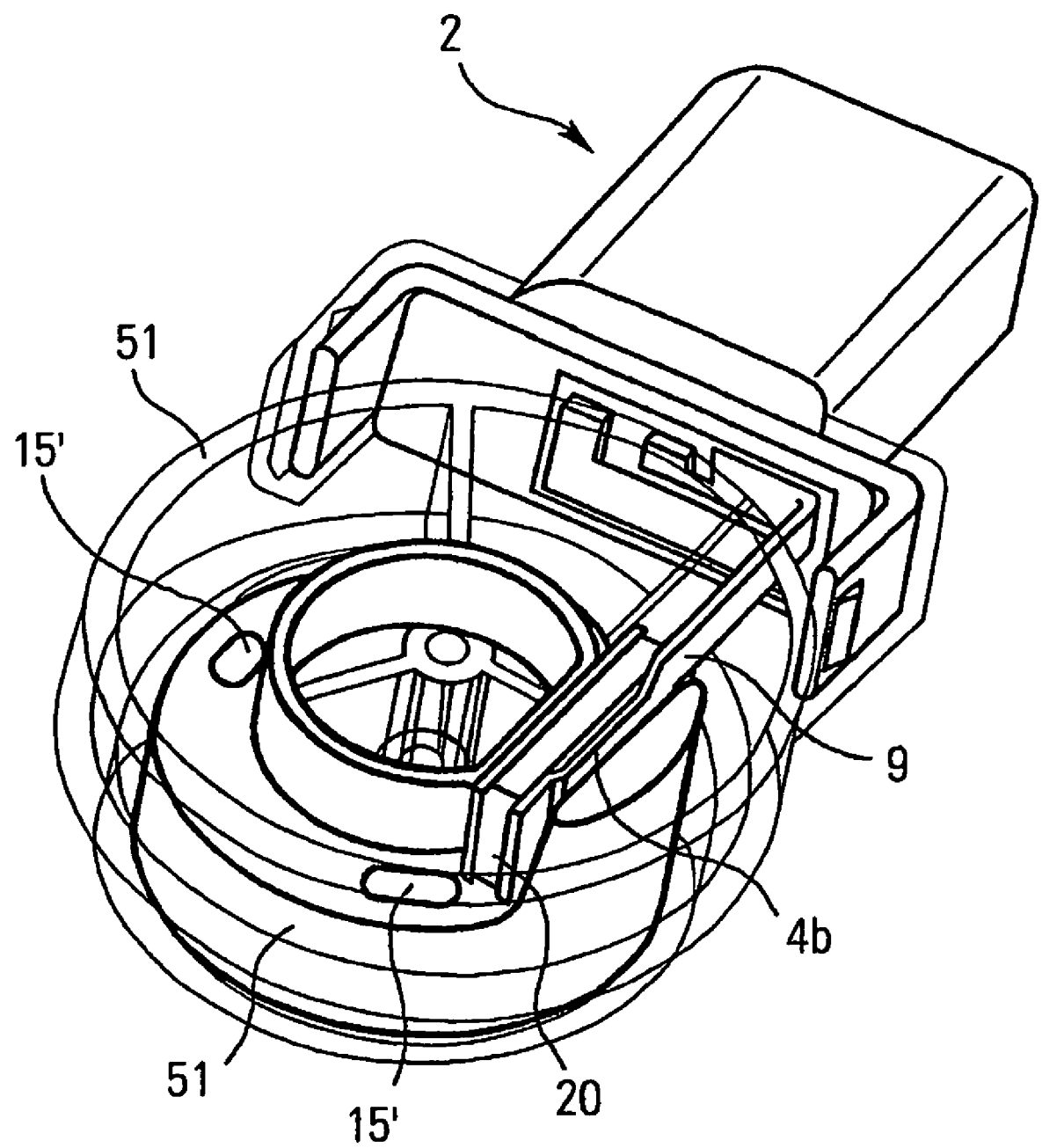
FIG. 16 illustrates a further perspective representation of the embodiment of FIGS. 14 and 15.

In FIG. 16, the heating device 2 of FIG. 14 is shown in the installed state together with a heat conducting element 51. The diaphragm valve 50 of FIG. 15 is here shown with its hidden lines for the sake of clarity.

In FIG. 16, it can be seen that the spring element 4b is elastically deformed in the inserted state. In this respect, a width of the projection 9 in the direction, in which the spring element 4b is preferably elastically deformable, is larger than the clearance of the well 20. In order to simplify the insertion of the projection 9 and the elastic deformation of the spring element 4b, appropriate insertion bevels can be provided on the projection 9.

As is also clear from FIG. 16, in another embodiment of the invention, the heat conducting element 51 can be used in conjunction with a fluid line 5 in the inner space 15 of which it is then inserted. In this respect, only the shape of the thermally conducting element 51 needs to be changed to enable it to fit into the inner space 15. Inner space 15 is shown in FIG. 15.

All the embodiments shown are intended particularly for crankcase venting systems in which the blow-by gases from the crankcase are for example passed to an air intake line on the internal combustion engine. The illustrated and described embodiments can however basically be used anywhere where flowing fluids are to be heated. Such fluids may be gases or liquids.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A heating device for a fluid line having an inner space configured to communicate fluid flow, the heating device comprising:
   a heating element;
   a holding device, adapted to couple the heating element to the fluid line; and
   a projection, adapted to receive the heating element and be inserted in a well in the fluid line, a well wall of the fluid line being contiguous to an inner space of the fluid line and the holding device having an elastic clamping section, at least partially contiguous to an outer wall of the fluid line.

2. The heating device according to claim 1, further comprising a recess formed between the projection and the clamping section, wherein the recess at least partially receives the outer wall of the fluid line.

3. The heating device according to claim 1 wherein the heating element is preassembled in the holding device.

4. The heating device according to claim 1 wherein the heating element is formed in the shape of a plate.

5. The heating device according to claim 1 wherein:
   the projection comprises a polygonal cross-section substantially transverse to the mounting direction; and
   a flat side of the polygon faces the inner space of the fluid line.

6. The heating device according to claim 1, further comprising a PTC heating element.

7. The heating device according to claim 6, further comprising:
   at least two electrically conducting contact plates wherein the PTC heating element is at least partially positioned between the conducting contact plates;
   a plug connector; and
   at least two connector contact lugs coupling the conducting contact plates to the plug connector.

8. The heating device according to claim 7 wherein the projection is formed by at least one electrically conducting contact plate.

9. The heating device according to claim 7 wherein at least one side of the projection is formed by a contact plate, configured to be contiguous with a well wall of the fluid line.

10. The heating device according to claim 7 wherein at least one contact plate comprises a spring section configured to elastically press against the heating element and a well wall of the fluid line.

11. The heating device according to claim 1, further comprising at least one guiding element configured to guide the holding device when coupling the holding device to the fluid line.

12. The heating device according to claim 1 wherein the holding device is fabricated from an electrically insulating material.

13. A kit for a heating module for fluid lines, comprising:
   a tubular fluid line having a well having an inner space configured to communicate fluid flow; and
   a heating device mounted on the fluid line, wherein the heating device comprises:
   a PTC heating element;
   a holding device, adapted to couple the heating element to the fluid line;
   at least two electrically conducting contact plates wherein the PTC heating element is at least partially positioned between the conducting contact plates;
   a plug connector;
   at least two connector contact lugs coupling the conducting contact plates to the plug connector; and
   a projection, adapted to receive the heating element and be inserted in a the well of the fluid line, wherein a well wall of the fluid line is contiguous to an inner space of the fluid line.

14. The kit according to claim 13, further comprising a thermally conducting element adapted to couple to the fluid line.

15. The kit according to claim 14 wherein the thermally conducting element at least partially surrounds an inner space of the fluid line.

16. A fluid line, comprising:
a tubular line section;
an inner space configured to communicate fluid flow;
a heating device having a heating element coupled to a holding device via a projection adapted to receive the heating element; and
an outer wall having a well and at least one well wall contiguous to the inner space and configured to receive the heating element via the projection, the projection being adapted to inserted in the well, the holding device having at least one guide element by which the heating device can be guided when coupling to the fluid line.

17. The fluid line according to claim 16 wherein the well comprises an inner surface of the fluid line and an outer surface of the outer wall.

18. The fluid line according to claim 16 wherein a portion of a wall of the fluid line contiguous to the well is thicker with respect to the surrounding regions.

19. The fluid line according to claim 16 wherein a well opening is substantially radially parallel to the outer wall of the fluid line.

20. The fluid line according to claim 16 wherein a well opening is substantially longitudinally parallel to the tubular line section.

21. The fluid line according to claim 16, operable to allow fluid flow contiguous to the well wall, wherein the well wall extends into the inner space of the fluid line.

22. The fluid line according to claim 16, wherein the projection protrudes into the inner space.

23. The fluid line according to claim 16 wherein the well wall comprises a partition, dividing the inner space.

24. The fluid line according to claim 16, further comprising a quadrangular section on the well in a direction substantially transverse to the mounting direction, wherein at least one flat side of the quadrangle faces the inner space.

25. The fluid line according to claim 16 wherein the inner surface of the outer wall facing the inner space of the fluid line has at least one flat section.

26. The fluid line according to claim 16 wherein the guide element comprises at least one groove.

27. The fluid line according to claim 16, further comprising at least one weakened region, wherein limited deformation of the well can be realized by application of a force.

28. The fluid line according to claim 27 wherein the weakened region is groove shaped.

29. The fluid line according to claim 27 wherein the weakened region is formed in the outer surface of the outer wall.

30. The fluid line according to claim 27 wherein the weakened region overlaps the well in a substantially radial direction.

31. The fluid line according to claim 16 wherein the fluid line is fabricated from a thermally conducting metallic material.

32. The fluid line according to claim 16 wherein the well is separated from the inner space of the fluid line by the outer wall.

33. The fluid line according to claim 16 wherein the fluid line is formed as an angled element in which the fluid flow direction in operation can be deviated by a certain angle.

34. The fluid line according to claim 33 wherein the well is arranged in a front surface of the fluid line.

35. The fluid line according to claim 16 wherein the fluid line is formed as a tubular element.

36. The fluid line according to claim 16 wherein the fluid line is formed as a valve.

37. The heating device according to claim 16 wherein the fluid line is for a crankcase venting system of an internal combustion engine.

38. A heating device for a fluid line, comprising:
a PTC heating element;
a holding device, adapted to couple the heating element to the fluid line; and
a projection, adapted to receive the heating element and be inserted in a well in the fluid line, wherein a well wall of the fluid line is contiguous to an inner space of the fluid line;
at least two electrically conducting contact plates wherein the PTC heating element is at least partially positioned between the conducting contact plates;
a plug connector; and
at least two connector contact lugs coupling the conducting contact plates to the plug connector.

39. The heating device according to claim 38 wherein the projection is formed by at least one electrically conducting contact plate.

40. The heating device according to claim 38 wherein at least one side of the projection is formed by a contact plate, configured to be contiguous with a well wall of the fluid line.

41. The heating device according to claim 38 wherein at least one contact plate comprises a spring section configured to elastically press against the heating element and a well wall of the fluid line.

42. A heating device for a fluid line having an inner space configured to communicate fluid flow, the heating device comprising:
a heating element;
a holding device, adapted to couple the heating element to the fluid line;
a projection, adapted to receive the heating element and be inserted in a well in the fluid line, wherein a well wall of the fluid line is contiguous to an inner space of the fluid line; and
at least one guiding element configured to guide the holding device when coupling the holding device to the fluid line.

* * * * *

UNITED STATES PATENT AND TRADEMARK OFFICE
CERTIFICATE OF CORRECTION

| | |
|---|---|
| PATENT NO. | : 7,387,114 B2 |
| APPLICATION NO. | : 10/519694 |
| DATED | : June 17, 2008 |
| INVENTOR(S) | : Thomas Gschwind et al. |

It is certified that error appears in the above-identified patent and that said Letters Patent is hereby corrected as shown below:

<u>Column 12</u>

Line 65, "in a the well" should read as --in the well--.

Signed and Sealed this

Seventeenth Day of March, 2009

JOHN DOLL
*Acting Director of the United States Patent and Trademark Office*